(12) United States Patent
Pipp

(10) Patent No.: US 9,121,685 B2
(45) Date of Patent: Sep. 1, 2015

(54) CLAMP CIRCUMFERENCE MEASURING GAUGE

(75) Inventor: Wally Pipp, Birmingham, MI (US)

(73) Assignee: A. Raymond et Cie, Grenoble (FR)

( * ) Notice: Subject to any disclaimer, the term of this patent is extended or adjusted under 35 U.S.C. 154(b) by 359 days.

(21) Appl. No.: 13/548,608

(22) Filed: Jul. 13, 2012

(65) Prior Publication Data

US 2013/0031796 A1 Feb. 7, 2013

Related U.S. Application Data

(60) Provisional application No. 61/507,158, filed on Jul. 13, 2011.

(51) Int. Cl.
| | | |
|---|---|---|
| *G01B 3/00* | (2006.01) | |
| *G01B 5/02* | (2006.01) | |
| *G01B 5/20* | (2006.01) | |

(52) U.S. Cl.
CPC .............. *G01B 5/025* (2013.01); *G01B 5/201* (2013.01)

(58) Field of Classification Search
CPC ........ G01B 3/22; G01B 11/306; G01B 21/20; G01B 3/38; G01B 5/008; G01B 5/08; G01B 5/245
USPC .................................. 33/555.1, 542
See application file for complete search history.

(56) References Cited

U.S. PATENT DOCUMENTS

| | | |
|---|---|---|
| 1,448,222 A | 3/1923 | Johnston et al. |
| 2,609,610 A | 9/1952 | Elmes |
| 3,744,140 A | 7/1973 | Kyrk |
| 3,967,383 A | 7/1976 | Collins |
| 4,161,823 A | 7/1979 | Collins |
| 4,413,637 A | 11/1983 | Irving |
| 4,914,821 A | 4/1990 | Hurt |
| 5,067,246 A | 11/1991 | Hesske et al. |
| 5,103,571 A | 4/1992 | Richards |
| 5,174,030 A | 12/1992 | Clot et al. |
| 5,184,407 A | 2/1993 | Watrous |
| 5,193,287 A | 3/1993 | Coulter et al. |
| 5,216,818 A * | 6/1993 | Rucinski et al. ................ 33/542 |
| 5,269,069 A | 12/1993 | Min |
| 5,383,283 A | 1/1995 | Olsen et al. |
| 5,414,943 A | 5/1995 | Vogt |
| 5,491,903 A | 2/1996 | Osborn et al. |
| 5,529,489 A | 6/1996 | Herrera |
| 5,613,302 A | 3/1997 | Berman et al. |
| 6,009,631 A | 1/2000 | Gensler |
| 6,253,459 B1 * | 7/2001 | Barnhill ....................... 33/514.1 |
| 6,490,805 B1 * | 12/2002 | Forschler et al. .............. 33/542 |

(Continued)

OTHER PUBLICATIONS

International Search Report and the Written Opinion of the International Searching Authority, A. Raymond et Cie, Jul. 13, 2012.

*Primary Examiner* — Yaritza Guadalupe-McCall

(74) *Attorney, Agent, or Firm* — McDonald Hopkins LLC

(57) ABSTRACT

A circumference measuring gauge for measuring an item is shown and described. The circumference measuring gauge may include a base, a fixture displaceably positioned on the base, the fixture capable of securing the item, and a measuring member having first and second ends, the first end fixed to the base and the second end fixed to the fixture, where the measuring member circumscribes the item. The circumference measuring gauge may also include a biasing member secured to the fixture, wherein the biasing member applies a predetermined force to the measuring member.

19 Claims, 4 Drawing Sheets

(56) References Cited

U.S. PATENT DOCUMENTS

| | | |
|---|---|---|
| 6,817,109 B2 | 11/2004 | Wong et al. |
| 6,817,110 B2 | 11/2004 | Bohnengel |
| 6,904,941 B2 | 6/2005 | Howard |
| 7,047,656 B1 | 5/2006 | Parker |
| 7,047,659 B2 * | 5/2006 | Holland ............................ 33/760 |
| 7,197,837 B1 * | 4/2007 | Blanford et al. ............. 33/555.1 |
| 7,360,320 B2 | 4/2008 | Kelley |
| 7,581,330 B1 * | 9/2009 | Redmond ....................... 33/611 |
| 7,624,512 B2 * | 12/2009 | Zhang et al. ................. 33/555.1 |
| 2003/0079359 A1 * | 5/2003 | Richards ....................... 33/555.1 |
| 2005/0241172 A1 * | 11/2005 | Holland ........................... 33/760 |
| 2006/0042109 A1 * | 3/2006 | Kanai et al. .................. 33/555.1 |
| 2009/0178289 A1 * | 7/2009 | Sakai et al. ................... 33/543.1 |
| 2010/0275456 A1 | 11/2010 | Lord |
| 2011/0258869 A1 * | 10/2011 | Bittkowski ..................... 33/512 |
| 2012/0266479 A1 * | 10/2012 | Park ................................ 33/712 |
| 2013/0031796 A1 * | 2/2013 | Pipp ............................. 33/555.1 |

* cited by examiner

CLAMP CIRCUMFERENCE MEASURING GAUGE

CROSS-REFERENCE TO RELATED APPLICATION

This application claims the benefit from U.S. Provisional Patent Application No. 61/507,158 entitled "Clamp Circumference Measuring Gauge" filed on Jul. 13, 2011, which is hereby incorporated in its entirety by reference.

FIELD OF ART

The present invention relates generally to a circumference measuring gauge and more particularly a circumference measuring gauge for determining an appropriate sized clamp for an object.

BACKGROUND

Measuring the actual circumference of an object is often very difficult, especially in measuring the circumference of an irregularly shaped object. Attempts to do so can often lead to inaccurate results, which may negatively impact performance. For example in determining the appropriate size clamp required to be applied to an object, the effective circumference of the object may be required. If the object is irregularly shaped, the required clamp size is often very difficult to determine. Therefore, one may have to use trial and error to determine the appropriate sized clamp required.

One may have to guess at the appropriate sized clamp, use the guessed sized clamp, and then continue to refine the size of the clamp until the correct one is chosen. This may significantly increase the time required to complete the task. It may also lead to choosing an inappropriately sized clamp, which may negatively impact the performance of the clamp.

This is particularly problematic with airbags as it is often difficult to determine the effective circumference of the air bag assembly. To assemble an airbag, clamps may be used to create a tight assembly that is capable of fitting within the small compartments of the vehicle required for installation of an airbag assembly. The air bag assemblies, as designed, often require added brackets and have anomalies due to irregular airbag folding and compression, and various processing features such as stitching and laminate adhesives. With all of these anomalies, direct measurement of the diameter may not be possible.

Current prior art mechanism are not capable of measuring this effective diameter of the air bag assembly. This often requires one to use trial and error and continue to attempt to fit clamps over the air bag assembly until one properly fits. Having to guess the correct size often leads to the wrong sized clamps being used and potentially causing production delays. This can make it very difficult to order the correct sized clamp and can lead to delays in determining the appropriate sized clamp.

Nevertheless, some may use measuring devices in an effort to measure the applicable circumference of the air bag assembly. The current prior art measuring devices, however, may not provide sufficiently accurate results. The measuring devices often fail to replicate the pressure applied by the clamp to the air bag assembly and tend to result in larger dimensions than actually required. Alternatively, one must use different sized clamps and attach them to the air bag assembly under full pressure until the clamp closes properly. This, however, can be very time consuming and does not necessarily lead to an accurate result.

There is a need, therefore, for a circumference measuring gauge that can measure the effective circumference of an irregularly shaped object to determine to the appropriate sized clamp to attach. Specifically, there is a need for a circumference measuring gauge that can measure the effective circumference of an air bag assembly to determine the appropriate sized clamp to attach.

DESCRIPTION OF THE DRAWINGS

The operation of the invention may be better understood by reference to the following detailed description taken in connection with the following illustrations, wherein.

SUMMARY

Figure 1:
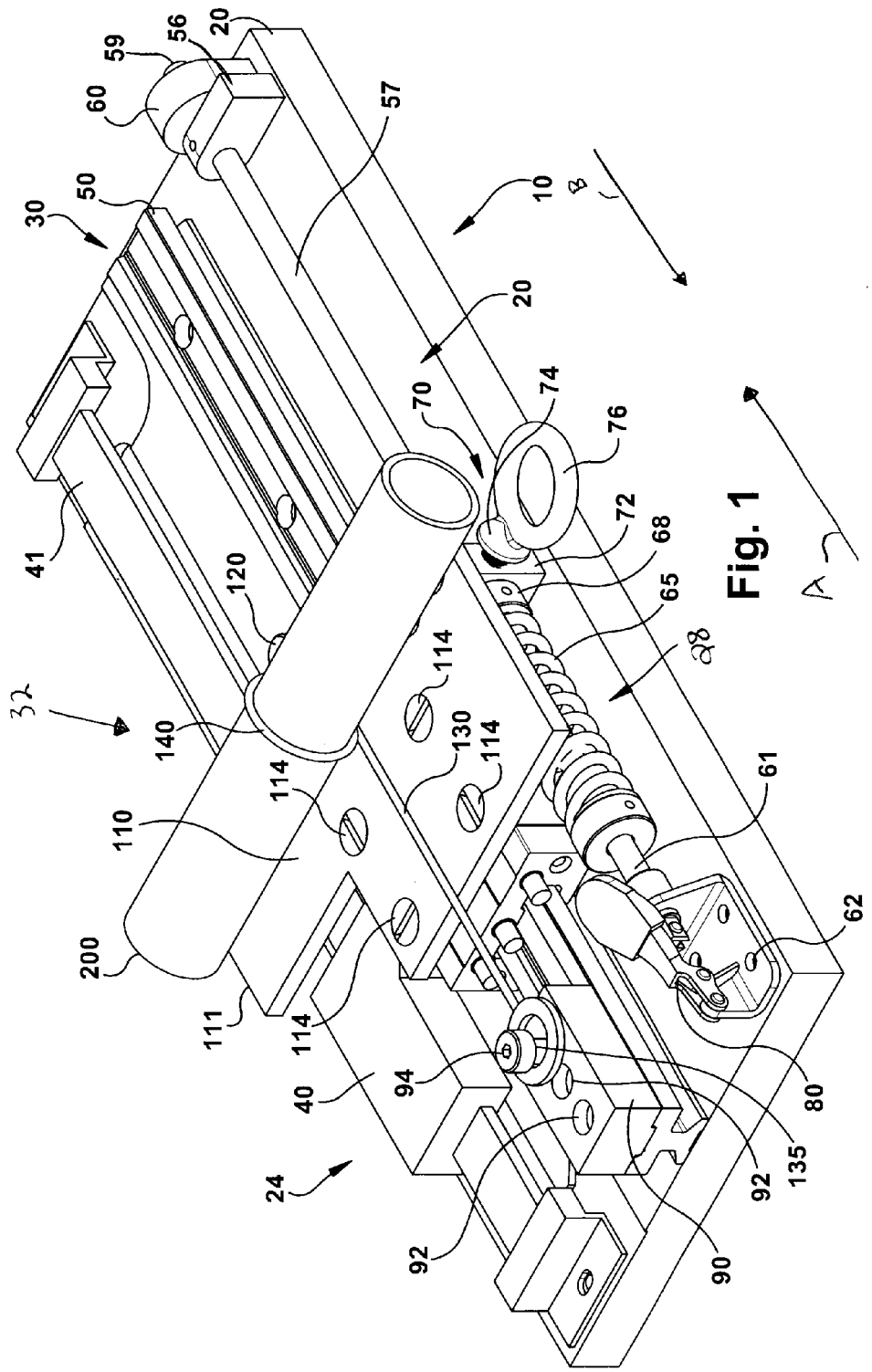
FIG. 1 is a perspective view of an exemplary embodiment of a clamp circumference measuring gauge.

A circumference measuring gauge for measuring an item is shown and described. The circumference measuring gauge may include a base, a fixture displaceably positioned on the base, the fixture capable of securing the item, and a measuring member having first and second ends, the first end fixed to the base and the second end fixed to the fixture, where the measuring member circumscribes the item. The circumference measuring gauge may also include a biasing member secured to the fixture, wherein the biasing member applies a predetermined force to the measuring member.

A circumference measuring gauge capable of measuring an item may include a base, a track attached to the base, a fixture selectively moveable on the track, the fixture capable of securing the item, and a measuring member having first and second ends, the first end engaged with the base and the second end engaged with the fixture, where the measuring member is capable of circumscribing the item. The circumference measuring gauge may also include a biasing member secured to the base and operatively engaged with the fixture, where the biasing member applies a predetermined force to the measuring member, and a measurement device, where the measurement device measures displacement of the fixture along the track.

A circumference measuring gauge capable of determining an effective diameter of an air bag assembly may include a base capable of being placed on a surface, a track attached to the base, a fixture selectively slidable along the track, the fixture capable of holding the air bag assembly, and a measuring wire having first and second ends and a looped portion positioned between the first and second ends, the first end engaged with the base and the second end engaged with the fixture, where the loop of the measuring wire circumscribes the air bag assembly. The circumference measuring gauge may also include a force applying member secured to the base and operatively engaged with the fixture, where the force applying member is capable of applying first and second forces to the air bag assembly, and a measurement device, where the measurement device measures displacement of the fixture along the track.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

A clamp circumference measuring gauge 10 is shown in FIGS. 1-4. The clamp circumference measuring gauge 10 may comprise a base 20, a measuring device 24, a biasing take-up feature 28, a displacement member 30, and a fixture 32. These features may be attached and/or operatively engaged with respect to one another in any appropriate manner. The present teachings are not limited to the specific embodiments shown herein.

In exemplary embodiments shown in FIGS. 1-4, the base 20 may be substantially rectangular in shape. Alternatively, however, the base 20 may be of any appropriate shape, such as for example, substantially square, ovular, ovoidal, circular, triangular, pentagonal, hexagonal, trapezoidal, or the like. The base 20 may be made of a material such as steel, stainless steel, aluminum, or any other suitably rigid material. The present teachings are not limited to a specific shape or material for the base 20.

The base 20 may include an attachment device (not shown) that may permit it to be fixedly or selectively secured to a work surface such as a work bench or the like. The attachment device (not shown) may comprise apertures extending through a width of the base 20 through which fasteners may pass to secure the base 20 to the work bench or any other appropriate working surface. The attachment device may also include a clamping device to fixedly or selectively secure the base 20 to the work bench or any other appropriate working surface. It should be understood, however, that any appropriate device capable of fixedly and/or selectively securing the base 20 to the work bench or any other appropriate working surface. Still further, the base 20 may be capable of resting on any appropriate surface without the use of an attachment device. The weight of the base 20—plus the weight of the remaining clamp circumference measuring gauge 10—and the friction between the base 20 and the applicable surface may generally retain the clamp circumference measuring gauge 10 in an operative position.

As shown in FIG. 1, the measuring device 24 may be attached to the base 20 in any suitable manner. By way of non-limiting examples, the measuring device 24 may be fastened, welded, adhered, or the like to the base 20. The measuring device 24 may measure the displacement of an object, as described in more detail below, e.g., the fixture 32, which may produce a measurement of a circumference of an object such as an air bag assembly. In some embodiments, the measuring device 24 may comprise a digital measuring tool 40 capable of measuring the displacement of an object, and a track 41 on which the digital measuring tool 40 may be slidably displaced. Specifically, the measuring tool 40 may measure the displacement of the fixture 32 as further described below. Although, the measuring tool 40 is shown as a digital device, it should be understood that it is not limited to such. It can be any kind measuring tool such as an analog measuring tool, or the like. The track 41 may be attached to the base 20 in any manner. For example, ends of the track 41 may be welded, fastened, adhered using adhesives or any such other applicable method of attachment. The measuring tool 40 may be positionable along a length of the track 41 to measure displacement of an item, such as by way of a non-limiting example being slidable, rotatable, rollable or any other applicable displacement method.

Figure 2:
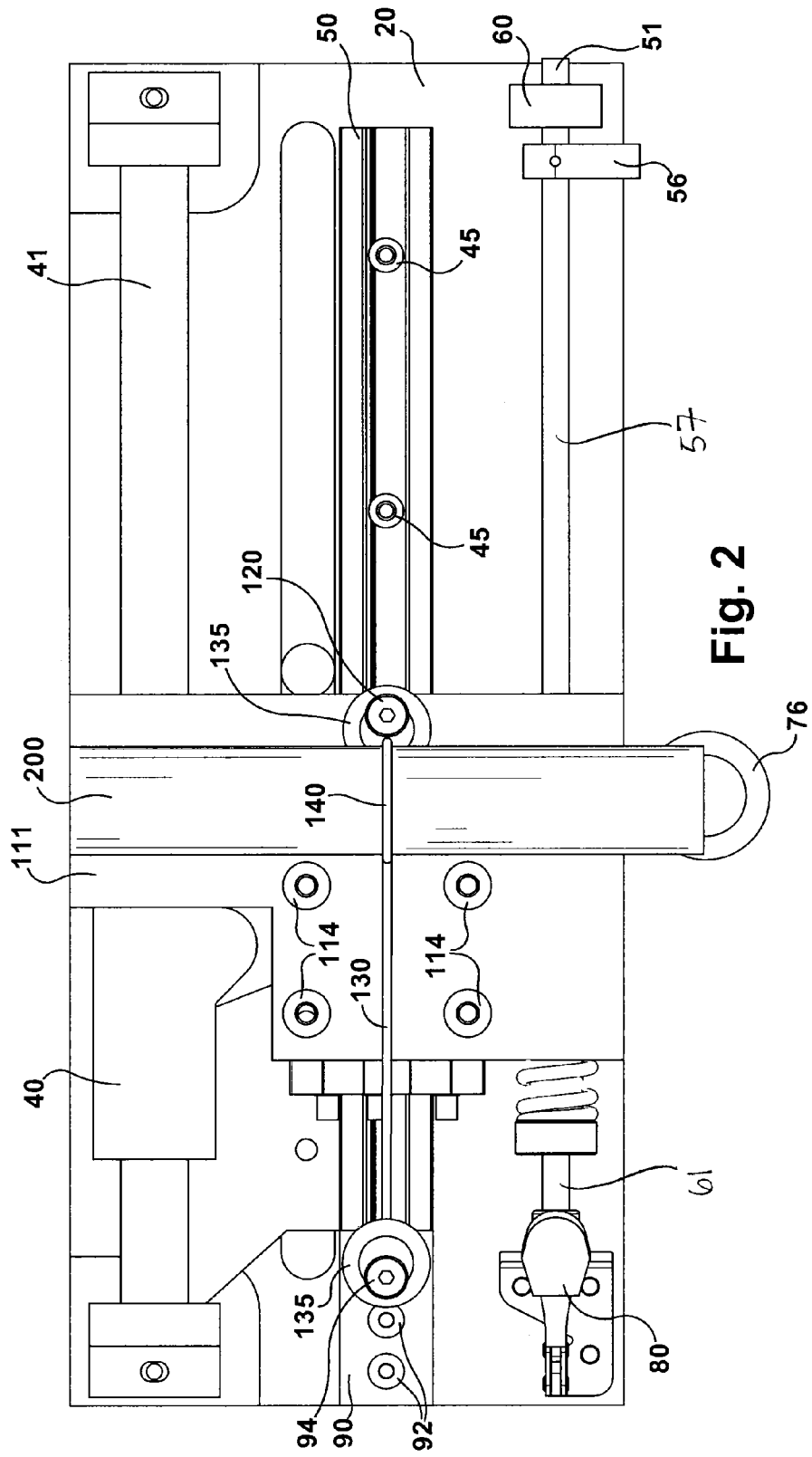
FIG. 2 is a top view of the embodiment of the clamp circumference measuring gauge of FIG. 1.
Figure 4:
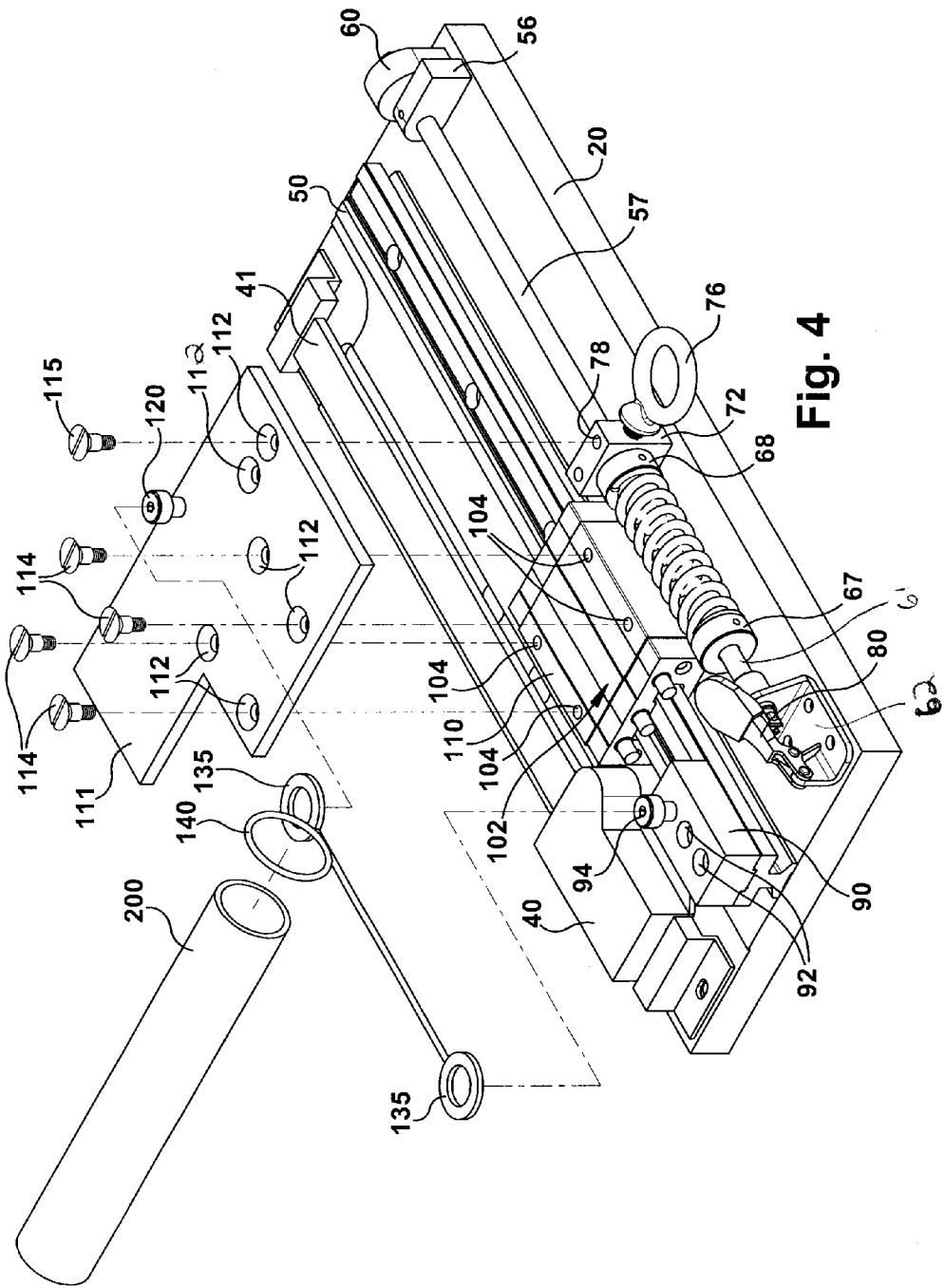
FIG. 4 is a partially exploded view of an embodiment of the clamp circumference measuring gauge of FIG. 1.

In some exemplary embodiments and upon inspection of FIGS. 1 and 4, it will be evident that the displacement member 30 may include at least one track 50 that may be attached to the base 20. Alternatively, any number of tracks may be used, such as for example a left-side and right-side track portions 50. The displacement member 30 may be attached to the base 20 in any appropriate manner. In some embodiments, the displacement member 30 may be attached by using for example fasteners 45 as shown in FIG. 2. While two fasteners 45 are shown, any number of fasteners may be used. Alternatively, the displacement member 30 may attached to the base 20 by using adhesive, welding, or the like. Any appropriate method of attachment may be used without departing from the present teachings. The fixture 32 may be capable of being displaced along at least a length of the track 50 as described in detail below.

The biasing take-up feature 28 of the clamp circumference measuring gauge 10 may be operatively secured with the base 20. In some embodiments, the biasing take-up feature 28 may comprise a substantially rectangular tab 56 and a first connecting rod 57 having one end 59 slidably attached to a mount 60. In such embodiments, the mount 60 may be fixed to the base 20 in any appropriate manner, such as for example, welding, using fasteners, using adhesives or the like. The biasing take-up feature 28 may further include a second connecting rod 61 attached to a second mount 62. The second mount 62 likewise may be attached to the base 20 in any appropriate manner, such as for example, welding, using fasteners, using adhesives or the like. The mount 60 and second mount 62 may be attached to the base 20 in generally the same manner or may be attached in a different manner. The present teachings are not limited to a specific manner of attachment. Still further, while the mount 60 and second mount 62 are shown as being different, it should be understood that the mount 60 and second mount 62 may also be substantially similar. The mount 60 may be laterally spaced from the second mount 62 as evident from FIG. 1.

The tab 56 may be attached to the connecting rod 57 in any appropriate manner. By way of a non-limiting example, the tab 56 may be attached using fasteners—such as pins (not shown), adhesives, being welded, integrally formed therewith, and the like. While a substantially rectangular shape is shown, the tab 56 may be of any appropriate shape. By way of a non-limiting example, the tab 56 may be of an ergonomic shape that may assist a user in gripping the tab 56. The tab 56 may, in the alternative, take any other appropriate shape, such as generally square, circular, ovoidal, or the like.

Figure 3:
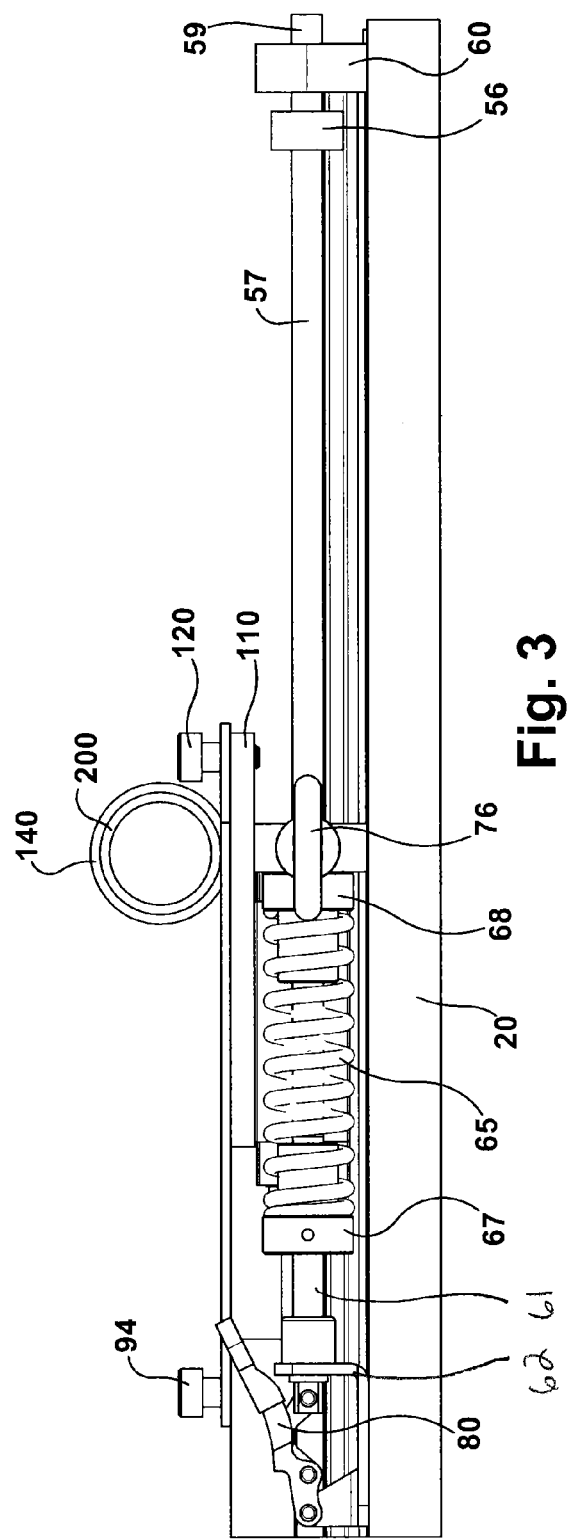
FIG. 3 is a side view of the embodiment of the clamp circumference measuring gauge of FIG. 1.

The biasing take-up feature 28 may also include a biasing member 65, such as a spring-loaded member, or more specifically, a coil spring as shown in more detail in FIGS. 3 and 4. While the coil spring 65 is shown, the biasing member 65 may be any appropriate biasing member and is not limited to the coil spring shown and described. The biasing member 65 may be engaged between the first connecting rod 57 and the second connecting rod 61 such that the biasing member 65 may be capable of biasing with respect to either of the first and second connecting rods 57, 61 or both the first and second connecting rods 57, 61. As is evident from FIG. 1, the biasing member 65 may be attached between the first and second connecting rods 57, 61 which may result in the first and second connecting rods 57, 61 being biasingly attached.

In some embodiments, the biasing take-up feature 28 may include a first collar 67 and a second collar 68 laterally disposed from the first collar 67. The first and second collars 67, 68 may be positioned between the biasing member 65, i.e., the first collar 67 may be positioned to engage one end of the biasing member 65 and the second collar 68 may be positioned to engage a second end of the biasing member 65. The first and second collars 67, 68 may engage the biasing member 65 in any appropriate manner.

The first collar 67 may be secured with the second connecting rod 61 in any appropriate manner, such as through fasteners, welding, adhesives or the like. By way of a non-limiting example, the first collar 67 may be fixedly secured to the second connecting rod 61 through the use of fasteners such as pins. The second collar 68 may be secured with the first connecting rod 57 in any appropriate manner, such as through fasteners, welding, adhesives or the like. By way of a non-limiting example, the second collar 68 may be fixedly secured to the first connecting rod 57 through the use of fasteners such as pins. This may result in the first and second connecting rods 57, 61 being operatively connected with the biasing member 65 positioned therebetween such that the biasing member 65 may be capable of biasing the first and/or second connecting rods 57, 61 relative to one another. More specifically, the biasing member 65 may be positioned between the first and second collars 67, 68 that may be attached to the second and first connecting rods 61, 57, respectively.

The biasing take-up feature 28 may further include an adjustment device 70 that may be capable of applying a predetermined pressure as described in more detail below. The adjustment device 70 may be of any appropriate construction. By way of a non-limiting example, the adjustment device 70 may include a block 72 and a threaded fastener 74 with a gripping member, such as the looped end 76 shown. The threaded fastener 74 may be threaded through a mating aperture (not shown) of the block 72 until it engages with the first connecting rod 57 securing the block 72 in an appropriate position with respect to and along the first connecting rod 57. This may result in the securing block 72 being moveable in unison with the connecting rod 57. It should be understood, however, that the adjustment device 70 may be of any appropriate construction and is not limited to that shown and described herein.

The looped end 76 may be integrally formed with the threaded fastener 74 as a monolithic member or may be attached thereto through a subsequent operation. Still further, while the end of the threaded fastener 74 is shown and described as being a looped end, the present teachings are not limited to such. Any appropriately shaped device may be used with the threaded fastener 74 to assist the user to grip and rotate such. The block 72 may further include an aperture 78 as is shown in FIG. 4 and is detailed further below.

The biasing take-up feature 28 may further include a displacement clamp 80. The displacement clamp 80 may be attached to the second mount 62 in any appropriate manner, such as by fastening, adhering, welding or the like. The displacement clamp 80 may also be operatively engaged with the second connecting rod 61 in any appropriate manner as shown in more detail in FIG. 4. By way of a non-limiting example, the displacement clamp 80 may shift the second connecting rod 61 laterally towards the direction of arrow A in FIG. 1 as described in more detail below when operating the clamp circumference measuring gauge 10.

The fixture 32 of the clamp circumference measuring gauge 10 may include a mounting block 90 that may be attached to the base 20 or alternatively, as shown in FIG. 4, may be attached to the displacement member 30 such that it may be positionable along at least a portion of a length of the displacement member 30. More specifically, the mounting block 90 may engage the track portion 50 of the displacement member 30 such that it may be slidable (or otherwise moveable) relative to the track portion 50 or may be fixedly secured to the track portion 50 whereby the track portion 50 may be positionable relative to the base 20. The mounting block 90 may include a plurality of apertures 92. While three such apertures 92 are shown in the drawings, any number of apertures may be used. The apertures 92 may be sized to selectively receive a post 94 that may threadingly engage the apertures 92. The post 94 may threadingly engage any of the apertures 92 so that it may be selectively positioned on the mounting block 90 at the appropriate position. By way of a non-limiting example, the post 94 may secure the mounting block 90 in place on the displacement member 30.

The fixture 32 may further include a displaceable block 100 that may be capable of displaceably engaging the displacement member 30. The displaceable block 100 may be positionable along a length, or at least a portion of the length, of the displacement member 30. More specifically, the displaceable block 100 may be positionable along a length, or at least a portion of the length, of the track portion 50, as required to accommodate different sized objects to measure. The displaceable block 100 may have a track engaging portion that may have a shape that matingly engages with the track 50. By way of a non-limiting example, the track 50 may have a generally male dovetail shape while the track engaging portion of the displaceable block 100 may have a female dovetail shape. While the mating dovetail shapes are shown and described, the present teachings are not limited to the same. Any appropriately mating shapes may be used such that the displaceable block 100 may be moveable along the track 50. Still further, the displaceable block 100 may be fixed with the track 50 and the track 50 may be movable with respect to the base 20.

Further, the displaceable block 100 may include a top surface 102. The top surface 102 may include a plurality of apertures 104. By way of a non-limiting example, and as shown in FIG. 4, the displaceable block 100 may include four threaded apertures 104. It should be understood, however, that any number of apertures may be used, not just the four as shown, e.g., one, two, three, five, etc.

The fixture 32 further may include a plate 110. The plate 110 may be shaped to fit over and removably attach to the moveable block 100 and the block 72. The plate 110 may include an extension portion 111 that may assist in holding the object to be measured by creating a holding platform for such object, e.g., the extension portion 111 may be capable of holding an air bag assembly 200 such as shown in FIG. 1. The plate 110 may include a plurality of apertures 112. As shown in FIG. 4, the plate 110 may include six apertures 112—although any number of apertures 112 may be used, e.g., one, two, three, four, five, seven, etc. Some of the plurality of the apertures 112 may be positioned to mate with the apertures 104 on the top surface 102 of the moveable block 100. Additionally, a pair of the apertures 112 may align with the apertures 78 of the block 72. By way of a non-limiting example, fasteners 114 may be passed through the apertures 112 and may threadingly engage the apertures 104 of the moveable block. In addition, set screws 115 may be used to threadingly engage the apertures 78 of the block 72 through apertures 112 to further secure the plate 110 to the block 72 to assist in applying the appropriate load as described below.

The plate 110 may further include an additional aperture (not shown) through which a post 120 may be attached, or may alternatively have attached directly to the plate 110 the post 120. The post 120 may substantially laterally align with the post 94. The posts 120 and 94 may align such that a wire 130 having each end with a loop portion 135 may removably be secured to the posts 120 and 94. In this embodiment, the looped portions 135 may fit over the posts 120 and 94 to hold the wire 130 in place under the applicable load as described below.

The wire 130 may include a circumference measuring portion 140. In the embodiment shown, the circumference measuring portion 140 comprises a loop created in the wire 130 that is large enough to wrap around the circumference of the object the gauge 10 is to measure. By way of a non-limiting example, the loop 140 may be capable of generally circumscribing the air bag assembly 200.

In operation, the clamp circumference measuring gauge 10 may use the wire 130 wrapped around an object such as for example an airbag assembly 200 shown in the drawings and the digital measuring tool 40 to determine the measured circumference of the airbag assembly 200. The clamp circumference measuring gauge 10 may be capable of measuring the operative circumference (the operative diameter may be determined as indicated below) of the air bag assembly 200 to determine the appropriate sized clamp to be used with and attached to the air bag assembly 200 before being inserted into and/or assembled with a vehicle. To use the clamp circumference measuring gauge 10 the operator may first zero the digital measuring tool 40. To zero the digital measuring tool 40, the operator may install the wire 130 without the airbag assembly 200. This way the operator may be effectively measuring the length of the wire 130. Here, however, instead of measuring the length of the wire 130, the operator zeros the digital measuring tool 40, i.e., when the clamp circumference measuring gauge 10 is in this state, the wire 130 may be taut and the measuring device 24 may be zeroed. Then when the operator installs the airbag assembly 200 on the gauge 10, the reading on the digital measuring tool 40 becomes the measured circumference of the airbag assembly 200.

To install the airbag assembly 200 on the clamp circumference measuring gauge 10, the operator may wrap the wire 130 around the airbag assembly 200 such that the circumference measuring portion 140 wraps around the airbag assembly 200. The operator may then reconnect the wire 130 to the two posts 94 and 120 on the fixture 32. One of the posts 94 may be fixed while the other post 120 is mounted onto the sliding plate 110 on the fixture 32. The digital measuring tool 40 is also operatively engaged with the displacement member 30, and may be capable of measuring displacement of the fixture 32. With the airbag assembly 200 and wire 130 in place, the initial slack in the wire 130 may be taken up by applying a first force to the wire 130 such as through positioning the fixture along the displacement member 30 toward the direction of arrow B, which is described below.

One problem that occurs with measuring airbag assemblies 200 is that the assemblies are not always tightly held together. Adding to the problem, some of the materials of the airbag assembly 200 are compressible. To improve accuracy, the present clamp circumference measuring gauge 10 includes the biasing take-up feature 28. By way of a non-limiting example, the take-up process of the biasing take-up feature 28 may mimic the airbag assembly 200 in the clamped state, which may lead to a more accurate determination of an appropriate clamp size.

To work the biasing take-up feature 28, the operator may install the airbag assembly 200 as described above while the block 72 may be loose and may not be loaded. While certain of the slack may be removed from the wire 130 during the zeroing process described above, all of the slack may be taken out of the wire 130 first by pushing the first connecting rod 57 towards an appropriate direction, such as the direction of arrow B shown in FIG. 1. Specifically, a user may grip the tab 56 and may move the first connecting rod 57 toward the second connecting rod 61 and the second mount 62. Doing so may remove the slack in the wire 130. This may help ensure that the compression of the biasing member 65 matches the deflection of the displacement clamp 80 when it is applied, i.e., it takes out the lost motion of the biasing member 65.

In order to push the first connecting rod 57 one may apply a force on the rectangular tab 56 mounted on the first connecting rod 57 in a direction of arrow B in FIG. 1. This can be done by hand, a weight may be attached to the tab 56, or any other suitable load may be applied in any appropriate manner to the tab 56. In operation, the end portion 59 of the connecting rod 57 may slide laterally towards and may slide through the mount 60. The block 72 may be mounted to the fixture 32 such that it remains slideable along the first connect rod 57. The operator may secure the fixture 32 to the block 72 and the first connecting rod 57 via the setscrews 115. This may secure the first connecting rod 57 with the fixture 32.

Once the block 72 is appropriately positioned and the first connecting rod 57 is appropriately positioned, the block 72 may be clamped hard to the first connecting rod 57 using the threaded feature 74. The operator may engage the looped end 76 and rotate the threaded feature 74 until it engages the first connecting rod 57 operatively engaging the block 72 with the first connecting rod 57. This may remove the slack from the wire 130 and may take lost motion out of the biasing member 65.

Removing the slack from the biasing take-up feature 28 may help minimize lost motion in the clamp circumference measuring gauge 10. Then the operator may apply a second pre-determined force as described below and determine the appropriate circumference of the air bag assembly 200.

With the first connecting rod 57 and the fixture 32 operatively coupled together a high load may be applied using the biasing take-up feature 28, i.e., the second force may be applied by the biasing take-up feature 28. By way of a non-limiting example, the biasing take-up feature 28 may apply approximately 100 pounds of force.

More specifically, when everything is secured as described above, the displacement clamp 80 may be actuated applying a significant load to and tensioning the wire 130, i.e., the displacement clamp 80 may apply a predetermined amount of load to the wire 130, which may mimic a load that may be applied by a clamp on the air bag assembly 200. By way of a non-limiting example, the load applied by the displacement clamp 80 may cause the wire 130 to help compress the airbag 200 and any wrinkles within the airbag 200 to duplicate the load that may be applied by a clamp and may duplicate the displacement of the clamp. For example, the displacement clamp 80 may cause the biasing member 65 to apply a pre-determined load to the wire 130. By way of a non-limiting example, the displacement clamp 80 may shift the adjustment device 70 laterally on the connecting rod 57 toward the mount 60 such that the biasing member 65 is compressed so that it may apply a predetermined load, such as by way of a non-limiting example approximately 100 pounds of force.

The significant load may represent substantially the same pressure as desired by the applied clamp to the air bag assembly 200. As such, the airbag assembly 200 may be squeezed into a tight bundle closely approximating the airbag assembly bundled under the compression of the applied clamp. In this state, the operator then records the displacement of the fixture 32 as displayed on the digital measuring tool 40. This value may represent the measured circumference of the airbag assembly 200. More specifically, when the displacement clamp 80 is actuated the biasing member 65 may be compressed between the collars 67 and 68, which may apply a load to the block 72. This may in turn apply the load to the fixture 32, and may apply the load to the wire 130. This may result in determining the circumference of the airbag assembly 200 with a predetermine load applied thereto, which may help determine the appropriate sized clamp to be applied so that the clamped airbag assembly 200 may appropriately fit within the predetermined location of the vehicle.

These same slack take-up and significant load methods may also applied during the zeroing process. This may improve repeatability while canceling wire 130 stretch from the equation.

The measured circumference differs from the effective circumference in that the wire 130 does not bend purely at the inside diameter of the wire 130 as wrapped. Instead, the wire 130 bends at the neutral axis. The relationship between the neutral axis and the inside diameter of the wire 130 is determined by measuring a known sample that is perfectly round and has relatively the same diameter as the unknown sample. Using the known sample a correction factor can by determined which may then be used to calculate the unknown effective diameter and circumference. The difference between the two diameters becomes the correction factor. Using this correction factor, the effective circumference can be determined. With the effective circumference known, the effective diameter can be determined by dividing the effective circumference by the number pi.

The calculations are as follows:
Measure the actual diameter of the perfectly round sample using a caliper or similar devise.
Measure the circumference of the perfectly round diameter using the clamp circumference measuring gauge 10.
Calculate the measured diameter of the known sample by dividing the measured circumference by pi.
Calculate the correction factor by subtracting the actual diameter of the sample from the measured diameter.
Then measure the circumference of the unknown sample using the using the clamp circumference measuring gauge 10 described herein.
Apply the correction factor against the measured circumference to determine to determine the effective circumference.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

I claim:

1. A circumference measuring gauge for measuring an item, the circumference measuring gauge comprising:
   a base;
   a fixture displaceably positioned on the base, the fixture capable of securing the item;
   a measuring member having first and second ends, the first end fixed to the base and the second end fixed to the fixture, wherein the measuring member circumscribes the item and the measuring member includes a wire; and
   a biasing member secured to the fixture, wherein the biasing member applies a predetermined force to the measuring member.

2. The circumference measuring gauge of claim 1, wherein the biasing member causes the measuring member to apply a predetermined clamping force to the item.

3. The circumference measuring gauge of claim 2, wherein the item is an airbag assembly.

4. The circumference measuring gauge of claim 1, further comprising a displacement member attached to the base, wherein the fixture is displaceable along the displacement member.

5. The circumference measuring gauge of claim 4, further comprising a measurement device, wherein the measurement device measures the displacement of the fixture along the displacement member.

6. The circumference measuring gauge of claim 5, wherein the measurement device measures displacement of the fixture upon the predetermined force being applied to the measuring member to determine an effective diameter of the item.

7. A circumference measuring gauge capable of measuring an item, the circumference measuring gauge comprising:
   a base;
   a track attached to the base;
   a fixture selectively moveable on the track, the fixture capable of securing the item;
   a measuring member having first and second ends, the first end engaged with the base and the second end engaged with the fixture, wherein the measuring member is capable of circumscribing the item and the measuring member includes a wire;
   a biasing member secured to the base and operatively engaged with the fixture, wherein the biasing member applies a predetermined force to the measuring member; and
   a measurement device, wherein the measurement device measures displacement of the fixture along the track.

8. The circumference measuring gauge of claim 7, wherein the wire includes a first looped end at the first end, the first looped end capable of engaging a first post attached to the base and wherein the wire includes a second looped end at the second end, the second looped end capable of engaging a second post attached to the fixture.

9. The circumference measuring gauge of claim 8, wherein the biasing member includes first and second mounts attached to the base and a coil spring engaged between the first and second mounts.

10. The circumference measuring gauge of claim 9, wherein the biasing member includes first and second rods, the first rod is connected to the first mount and the coil spring and the second rod is connected to the second mount and the coil spring.

11. The circumference measuring gauge of claim 10, wherein the biasing member further includes an adjustment device moveable along with first rod between the coil spring and the first mount.

12. The circumference measuring gauge of claim 11, wherein the adjustment device is capable of applying a second force to the measuring member, the predetermined force being greater than the second force.

13. The circumference measuring gauge of claim 12, wherein the biasing member includes a displacement clamp attached to the second rod, the displacement clamp capable of being operatively positioned to apply the predetermined force.

14. A circumference measuring gauge capable of determining an effective diameter of an air bag assembly, the circumference measuring gauge comprising:
   a base capable of being placed on a surface;
   a track attached to the base;

a fixture selectively slidable along the track, the fixture capable of holding the air bag assembly;

a measuring wire having first and second ends and a looped portion positioned between the first and second ends, the first end engaged with the base and the second end engaged with the fixture, wherein the loop of the measuring wire circumscribes the air bag assembly;

a force applying member secured to the base and operatively engaged with the fixture, wherein the force applying member is capable of applying first and second forces to the air bag assembly; and a measurement device, wherein the measurement device measures displacement of the fixture along the track.

15. The circumference measuring gauge of claim 14, wherein first force generally removes slack between the measuring wire and the air bag assembly.

16. The circumference measuring gauge of claim 15, wherein the second force generally replicates force applied by a clamp operatively secured to the air bag assembly.

17. The circumference measuring gauge of claim 16, wherein the measurement device measures displacement of the fixture along the track with the second force being applied to the air bag assembly.

18. The circumference measuring gauge of claim 17, wherein the force applying member comprises:

first and second mounts attached to the base;

first and second rods, the first rod is connected to the first mount and the second rod is connected to the second mount a coil spring engaged between the first and second rods; and an adjustment device moveable along with first rod between the coil spring and the first mount.

19. The circumference measuring gauge of claim 18, wherein the first rod may be positioned in a first direction to apply the first force and the adjustment device may be positioned in a second direction to apply the second force, the first direction being different from the second direction.

* * * * *